United States Patent
Cotte et al.

(10) Patent No.: US 11,216,846 B2
(45) Date of Patent: Jan. 4, 2022

(54) SYSTEM FOR CONVEYING OBJECTS, IMPLEMENTING A SYSTEM FOR TARGETED DISTRIBUTION OF INFORMATION

(71) Applicant: PA. COTTE SA, Pully (CH)

(72) Inventors: Pierre-Alain Cotte, Amberg (DE); Laurent Gaussin, Suce sur Erdre (FR)

(73) Assignee: PA. Cotte SA, Pully (CH)

(*) Notice: Subject to any disclaimer, the term of this patent is extended or adjusted under 35 U.S.C. 154(b) by 121 days.

(21) Appl. No.: 16/335,826

(22) PCT Filed: Sep. 25, 2017

(86) PCT No.: PCT/EP2017/074216
§ 371 (c)(1),
(2) Date: Mar. 22, 2019

(87) PCT Pub. No.: WO2018/055156
PCT Pub. Date: Mar. 29, 2018

(65) Prior Publication Data
US 2020/0027130 A1    Jan. 23, 2020

(30) Foreign Application Priority Data
Sep. 26, 2016 (FR) .................... 1659056

(51) Int. Cl.
*G06Q 30/00* (2012.01)
*G06Q 30/02* (2012.01)
(Continued)

(52) U.S. Cl.
CPC ....... *G06Q 30/0267* (2013.01); *G06F 1/1652* (2013.01); *G06Q 10/0833* (2013.01);
(Continued)

(58) Field of Classification Search
CPC .......... G06Q 30/0261; G06Q 30/0267; G06Q 10/0833; H04W 4/029; H04W 4/80; H04W 4/021; G06F 1/1652
(Continued)

(56) References Cited

U.S. PATENT DOCUMENTS 9,107,026 B1 *  8/2015 Viswanadham ...... H04W 8/005
10,206,475 B2 *  2/2019 Pusey .................. A45C 13/001
(Continued)

FOREIGN PATENT DOCUMENTS

JP       2012038310       2/2012

OTHER PUBLICATIONS

Bizcommunity.com, Cape Town: SyndiGate Media Inc., Sep. 15, 2015 (Year: 2015).*
(Continued)

*Primary Examiner* — Matthew L Hamilton
(74) *Attorney, Agent, or Firm* — Faegre Drinker Biddle & Reath LLP (57) ABSTRACT

The invention relates to a system for conveying objects, comprising a computer platform, and comprising embedded devices in packages each having at least one digital recognition code, the platform including a database of the digital codes, the embedded devices each being capable of accessing geolocation resources, characterized in that the platform comprises a module for distributing advertisements to be distributed, each associated with a geographical distribution area datum, and in that it comprises transmitters/receivers, between the platform and the embedded devices, the platform being configured for receiving data on the geolocation of the packages and transmitting at least one advertisement to the embedded devices when the geolocation datum of said package enters the geographical distribution area of the advertisement.

8 Claims, 3 Drawing Sheets

(51) Int. Cl.
*H04W 4/029* (2018.01)
*H04W 4/80* (2018.01)
*G06F 1/16* (2006.01)
*G06Q 10/08* (2012.01)
*H04W 4/021* (2018.01)

(52) U.S. Cl.
CPC ........ *G06Q 30/0261* (2013.01); *H04W 4/021* (2013.01); *H04W 4/029* (2018.02); *H04W 4/80* (2018.02)

(58) Field of Classification Search
USPC .......................................................... 705/14
See application file for complete search history.

(56) References Cited

U.S. PATENT DOCUMENTS

| | | | |
|---|---|---|---|
| 10,561,187 B1* | 2/2020 | Baccus | A42B 1/004 |
| 10,832,015 B2* | 11/2020 | Hattrup | G06K 19/06037 |
| 2005/0234785 A1* | 10/2005 | Burman | G09F 3/0288 |
| | | | 705/28 |
| 2006/0061546 A1* | 3/2006 | Jong | G06F 1/1656 |
| | | | 345/156 |
| 2009/0319078 A1* | 12/2009 | Jackson | G06Q 10/08 |
| | | | 700/227 |
| 2011/0270681 A1* | 11/2011 | Outten | G06Q 30/00 |
| | | | 705/14.58 |
| 2012/0235791 A1 | 9/2012 | Donlan | |
| 2013/0342394 A1 | 12/2013 | Leslie | |
| 2013/0346156 A1* | 12/2013 | Ho | G06F 16/283 |
| | | | 705/7.33 |
| 2014/0249932 A1* | 9/2014 | Gilliam | G06Q 30/0251 |
| | | | 705/14.66 |
| 2014/0279596 A1 | 9/2014 | Waris | |
| 2015/0005010 A1* | 1/2015 | Zhang | H04W 4/023 |
| | | | 455/456.3 |
| 2015/0066795 A1* | 3/2015 | Gillen | G06Q 10/083 |
| | | | 705/330 |
| 2015/0112785 A1* | 4/2015 | Sharan | G06Q 30/0222 |
| | | | 705/14.23 |
| 2016/0242000 A1* | 8/2016 | Venkatraman | H04W 4/21 |
| 2016/0275448 A1* | 9/2016 | Bennett | G06Q 10/083 |
| 2017/0140434 A1* | 5/2017 | Lin | H04W 4/21 |
| 2017/0262884 A1* | 9/2017 | Miller | A45C 15/00 |
| 2019/0362391 A1* | 11/2019 | Sadovsky | G06Q 30/0259 |
| 2019/0367257 A1* | 12/2019 | Huhtasalo | B65D 85/1045 |
| 2020/0387929 A1* | 12/2020 | Zhu | G09G 3/32 |

OTHER PUBLICATIONS

International Search Report and Written Opinion of the European Patent Office, dated Oct. 23, 2017, for International Patent Application No. PCT/EP2017/074216; 14 pages.
English Translation of the International Preliminary Report on Patentability (Chapter I) issued by the International Searching Authority, dated Mar. 26, 2019, for International Patent Application No. PCT/EP2017/074216; 7 pages.

* cited by examiner

SYSTEM FOR CONVEYING OBJECTS, IMPLEMENTING A SYSTEM FOR TARGETED DISTRIBUTION OF INFORMATION

CROSS-REFERENCE TO RELATED APPLICATIONS

The present application is a national stage entry of International (PCT) Patent Application Number PCT/EP2017/074216, filed Sep. 25, 2017, which in turn claims priority to French Patent Application No. 1659056, filed Sep. 26, 2016, the subject matter of which are expressly incorporated herein by reference.

The field of the invention is that of logistics. More precisely, the invention relates to conveying objects, and more particularly objects the dimensions and weight of which allow their being conveyed by any person and by any, or almost any means.

Accordingly, the invention relates to a system for conveying objects the weight of which does not exceed 8 kg or, more generally, the dimensions and weight of which correspond to the definition of a piece of hand luggage for airlines. Of course, the invention also applies to objects of smaller dimensions and/or weights, down to the shipping of single envelopes.

In the field of the invention, some providers buying and selling products online have generated considerable expectations for the delivery of said products throughout the world.

However, internationally, express deliveries, in a few hours, are complicated or even impossible and are, at the least, very slow and/or very expensive. There are therefore very limiting factors for international commerce and private deliveries, while Internet commerce knows no border. As a result, international express deliveries constitute only a very small market, this despite huge revenues experienced by some international delivery companies.

This finding is linked to the fact that all the current delivery logistics systems are based on a centralized control approach based notably on:
grouping the goods to be conveyed;
bulk transport;
consignment by parcel.

In addition, analysis of conventional practices leads to ascertaining that:
local mail services are restricted to limited deliveries over relatively small, or even local geographical areas (the adoption of business models consisting in making resources available to users by actors other than the conventional professionals, tending, however, to generate new and significant opportunities);
national deliveries (more or less monopolistic) operating perfectly, within deadlines of around 24 hours, but this market is by definition limited to a single country;
international deliveries remain niche markets, favoring the development of specialized international delivery companies, with sometimes incompatible or even unacceptable deadlines and costs.

There is currently an expectation, express or implied, regarding the shipping and delivery of goods within short deadlines compared to current practice, for small fee amounts or even at low cost.

However, one way to satisfy this expectation lies in a community and/or collaborative approach, insofar as everyone is moving in a universe within which a large proportion of individuals together offer multiple opportunities for travel.

It is therefore conceivable according to this approach to set out with an object from a departure point by entrusting it to one of the individuals of a collaborative system and convey it to an arrival point via this individual alone or in relay with one or more other individuals of the collaborative system.

Of course, in such a system, it remains necessary to know in real time the position of the object to be conveyed, for locating it with respect to its arrival point and/or with respect to the individuals participating in the collaborative system.

In this context, for monitoring the movements of the objects to be conveyed, they may be provided with geolocation resources and communication means allowing them to transmit data relating to their location. Thus a system of tracking the progress of the objects is obtained.

However, such a solution leads to a technical problem regarding the electrical power supply of the geolocation and communication resources. Indeed, a system must further be provided for electrically recharging the power supply means dedicated to the geolocation of the object, which involves hard-to-manage constraints, involving transferring on to the individuals of the collaborative system the responsibility for monitoring the electrical recharging of the means in question.

Furthermore, whether or not as part of collaborative conveying, insofar as the packaging of the objects to be conveyed is capable of accessing geolocation resources, it may be useful or desired to be able to send information to the carrier of the package or individuals near the carrier, this via the package itself.

Such information may be of any type, namely:
advertisements;
event information;
geographical and/or historical information;
information related to the conveying in progress.

The objective of the invention is therefore to meet such an expectation, therefore by selectively distributing information via a traveling package to its carrier and/or persons in the vicinity of the carrier.

The invention also has the objective of forming part of a collaborative logistical approach involving little or no constraint at the level of individuals participating in the conveying of the objects, notably with regard to managing the electrical recharging level of the technical means coupled to the objects to be conveyed and involved in the spatiotemporal tracking of the objects.

The invention also has the objective of providing a global system for conveying objects, implementing such a system for selective distribution of information.

These and other objectives, which will become apparent later, are achieved thanks to the invention which relates to a system for conveying objects, comprising a computer platform and comprising embedded devices in packages intended to contain the objects and each having at least one digital recognition code, the platform including a database of digital codes, the embedded devices each being capable of accessing geolocation resources, characterized in that the platform comprises a module for distributing advertisements to be distributed, each associated with a geographical distribution area datum, and in that it comprises transmitters/receivers between the platform and the embedded devices, the platform being configured for receiving data on the geolocation of the packages and transmitting at least one advertisement to the embedded devices when the geolocation datum of said package enters the geographical distribution area of the advertisement.

Thus, thanks to the invention, it is possible to selectively distribute information, which may be of different kinds, to the carrier of a package or persons present around them, via the package.

Selective distribution is based on the geolocation of the package (and therefore also a priori that of its carrier), and makes it possible to distribute information e.g. of an advertising nature in connection with the services and/or commercial establishments within a predefined perimeter around the location of the package. Of course, it is thus possible notably to increase the relevance and impact of the distributed advertisements.

According to a preferred embodiment, the packages are provided with a screen, the advertisements being intended to be distributed on the screen.

Of course, this embodiment is not exclusive of other distribution means, e.g. sound.

In this case, the screen consists of electronic paper.

It is recalled that electronic paper is, in the context of the invention, particularly advantageous since it makes it possible to display text and images indefinitely, without consuming energy. In general, electronic paper consumes energy only when the displayed content is modified. The pixels of such a system thus have multiple distinct stable states, so as to keep intact the content displayed in the absence of an energy source.

According to a first variant embodiment, the geolocation resources are incorporated in the embedded devices of the packages.

As part of another variant embodiment, the computer platform includes at least one computer application intended to be loaded by portable computing units held by individuals capable of participating in conveying the objects, the geolocation resources being in this case advantageously incorporated in the portable units.

The portable units may then comprise first near field wireless communication means, the embedded devices each comprising:
  second near field wireless communication means, capable of communicating with the first near field wireless communication means,
  at least one computer processing module capable of cooperating with the second near field wireless communication means for retrieving and processing data supplied by said second near field wireless communication means.

Furthermore, the computer module comprises said computer application with a view to allowing the exchange of data between the computer module and the portable computing units, the computer application being configured for opening a communication channel intended to allow the embedded devices to access and use the geolocation resources of the computing units.

Thus, a spatiotemporal tracking system is obtained for tracking moving objects in a collaborative system for conveying objects by individuals of a community, without transferring responsibility for the correct operation of the technical means coupled to the conveyed object, with regard in particular to the electrical recharging level of the technical means coupled to the object to be conveyed for ensuring its geolocation.

Indeed, technical means that are large consumers of electrical power, such as geolocation resources, are absent from the technical means coupled to the conveyed object. Only means involving low power consumption are coupled to the conveyed object.

It follows that it is possible to electrically power technical means coupled to the conveyed object by a simple battery, capable of autonomously providing an electrical power supply over a long period.

According to the principle of the invention, the embedded devices are somehow grafted onto the portable, and optionally successive units during the mobility of the conveyed object, via the near field wireless communication means and use the "smartness" of the portable units, in particular regarding the geolocation resources incorporated in the portable units.

The embedded devices can thus travel long distances in complete electrical autonomy. In addition, they may be reused many times, without having to recharge them electrically, by being coupled to different successive objects to be conveyed.

Of course, the possible repeated reuse of the embedded devices adds an obvious economic interest to the tracking system, as well as an optimized carbon footprint by avoiding the rapid obsolescence of the embedded devices, either wholly or in part.

In a system for conveying objects according to the invention, the portable units are advantageously mobile phones carried by individuals. The result is that when an individual of the community carries an object to be conveyed, the embedded device is permanently close to the mobile phone of the individual in question, making it possible to communicate with it and to use its geolocation resources continuously or nearly so.

It is noted that the embedded devices may comprise electrical power supply means in the form of a non-rechargeable battery.

The embedded devices are thus provided with relatively inexpensive long-life batteries. Thus, the only electrical power supply management of the embedded devices consists in performing a simple replacement of the battery when it is completely discharged.

The invention also relates to a package used in a conveying system as previously described, characterized in that it comprises:
  an embedded device having at least one digital recognition code and being capable of accessing geolocation means;
  transmission/reception means for communicating with a platform including a database of the digital codes and comprising a module for distributing advertisements to be distributed, each associated with a geographical distribution area datum,
the embedded device being capable of accessing geolocation means for transmitting data on the geolocation of the package to the platform and for receiving at least one advertisement when the geolocation datum of said package enters the geographical distribution area of the advertisement.

The invention also relates to a method of conveying objects with the aid of a system as previously described, characterized in that it comprises the steps of:
  transmission/reception between the platform and the embedded devices,
  geolocation of embedded devices,
  reception by the platform of the data on the geolocation of the packages, transmission of at least one advertisement to the embedded devices when the geolocation datum of said package enters the geographical distribution area of the advertisement.

The invention also relates to a computer program comprising instructions suitable for executing the steps of the method previously described when said computer program is executed by at least one processor.

The invention further relates to a computer-readable medium on which a computer program is recorded comprising instructions for executing the steps of the method previously described.

Other features and advantages of the invention will appear more clearly on reading the following description of a preferred embodiment of the invention, given by way of a simple, illustrative and non-restrictive example, and the appended drawings in which.

As noted previously, the principle of the invention is to provide a system for conveying objects contained in packages, which may be in a collaborative mode, i.e. implemented by a set of individuals in a community, said system implementing a platform configured for receiving data on the geolocation of the packages and transmitting at least one advertisement to embedded devices in the package when the geolocation datum of said package enters a geographical area triggering the distribution of the advertisement.

Figure 1:
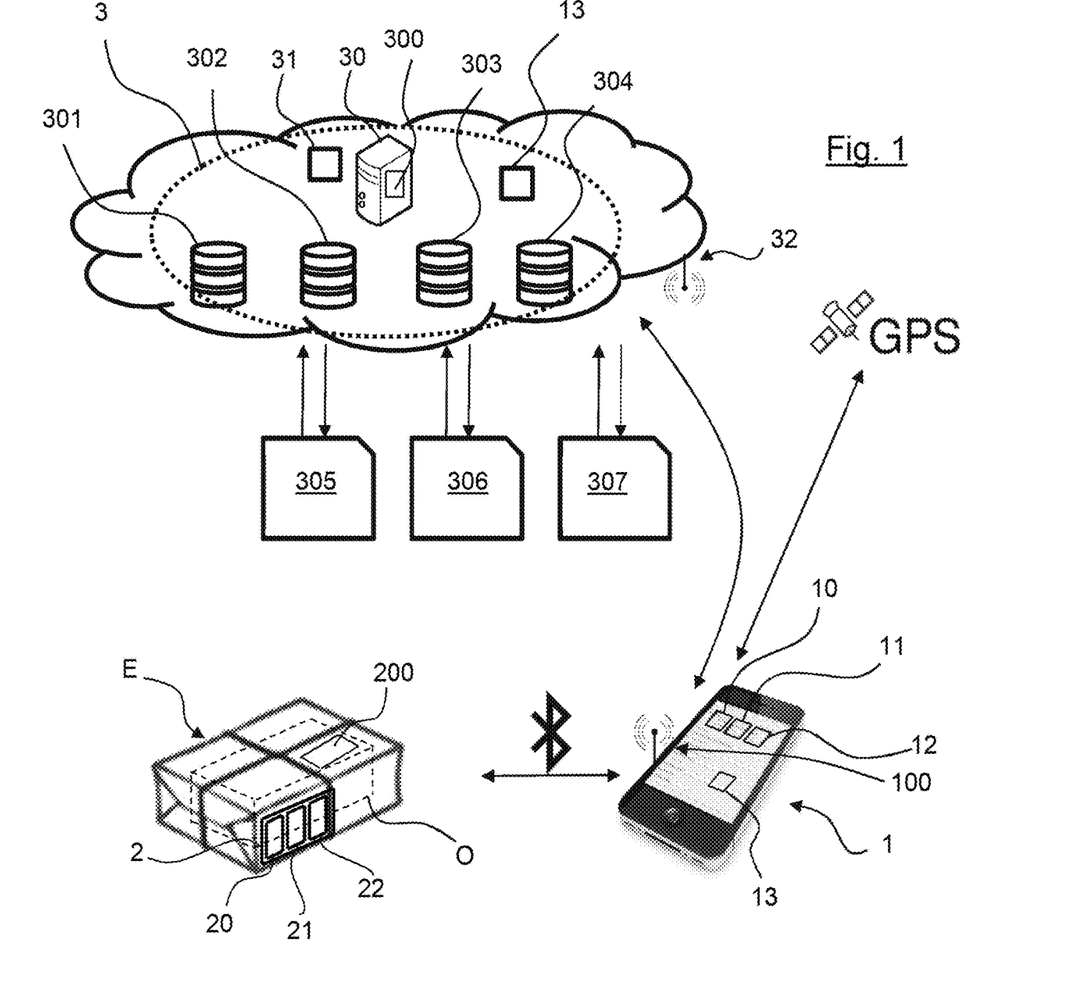
FIG. 1 schematically illustrates a system for conveying objects according to the invention.

As illustrated in FIG. 1, such a system is of the type comprising:

portable computing units 1 held by individuals I of a community;

a computing platform 3 including a computer application 13 intended to be loaded by the portable computing units;

embedded devices 2 in packages E intended to contain the objects O to be conveyed, these packages being able to be any container (envelope, parcel, packet, etc.) of shapes and dimensions suited to the object to be conveyed, (the dimensions of the container and the overall weight of the container added to that of the contents being preferably, but not exclusively, suited to the criteria defined for hand luggage according to the criteria of the airlines).

According to a particular and preferred embodiment, the portable computing units consist of smartphones of a widespread common type, notably comprising first near field wireless communication means 10 and geolocation resources 11.

According to the principle of the invention, the embedded devices are each capable of accessing geolocation resources, and the platform includes a module for distributing 31 advertisements to be distributed, each associated with a geographical distribution area datum. In addition, the system comprises transmitters/receivers 32, 100 ensuring the exchange of data between the platform and the embedded devices, the platform being configured for receiving data on the geolocation of the packages and transmitting at least one advertisement to the embedded devices when the geolocation datum of said package enters the geographical distribution area of the advertisement.

Figure 2:
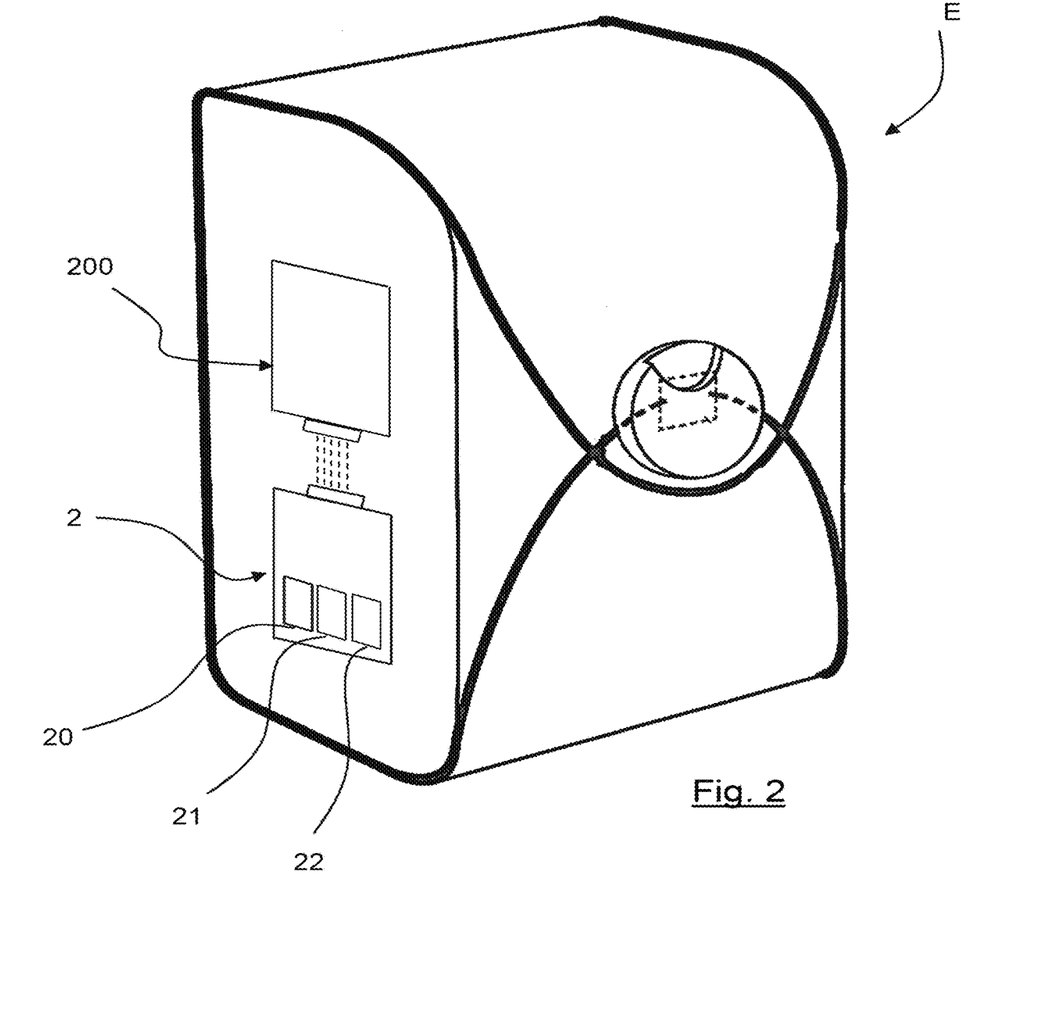
FIG. 2 illustrates a particular embodiment of a package for a system according to the invention.

According to the present embodiment, and as illustrated in FIG. 2, the packages are provided with a screen 200, the advertisements being intended to be distributed on the screen. This screen may be of different dimensions according to the versions of the packages, and will, of course, be placed on the package walls most exposed to being seen by people in the nearby vicinity of the carrier, or seen by the carriers themselves, according to the purpose and nature of the distributed advertisement.

The same package may thus be provided with multiple screens, with the possibility of allocating differentiated advertisements depending on the position of the screens on the package.

In any case, the screen preferably consists of electronic paper.

As previously noted, the choice of electronic paper proves advantageous in the context of the invention, ensuring low energy consumption regardless of the nature of the advertisement to be distributed, the power consumption, while remaining low, being only dependent on the frequency of renewal of the advertisement displayed on the screen.

It is noted that, as represented in FIG. 2, a package according to the invention may take the form of a bag or a backpack, but may also take any other form, such as that illustrated in FIG. 1 which resembles a parcel.

Similarly, according to the illustration provided in FIG. 2, the screen 200 is positioned on one side of the package, but may equally be placed on the front part of the package, or on the top of the package. As previously mentioned, multiple screens may also be provided and distributed over the package.

In any case, according to the principle of the invention, the package E includes:

an onboard device 2 having at least one digital recognition code (the platform including a database of all the digital codes of the packages) and being suitable for accessing geolocation means;

transmission/reception means (described in more detail later) for communicating, directly or indirectly, with the platform comprising a module for distributing advertisements to be distributed, each associated with a geographical distribution area datum.

In addition, the embedded device being capable of accessing geolocation means for transmitting data on the geolocation of the package to the platform and for receiving at least one advertisement, from a distribution module 31 incorporated in the platform, when the geolocation datum of said package enters the geographical distribution area of the advertisement.

According to a first approach of the invention, the geolocation resources are incorporated in the embedded devices of the packages. These further comprise communication means enabling them to exchange information directly with the platform. In this case, the embedded devices regularly transmit data relating to the geolocation of the package to the platform. The latter optionally transmits an advertisement to the package if the geographical area associated with the advertisement matches the geolocation of the package. The advertisement is then received directly by the embedded device, which processes the data relating to the advertisement so as to transmit this data to the screen (or to any other means of distribution).

Figure 3:
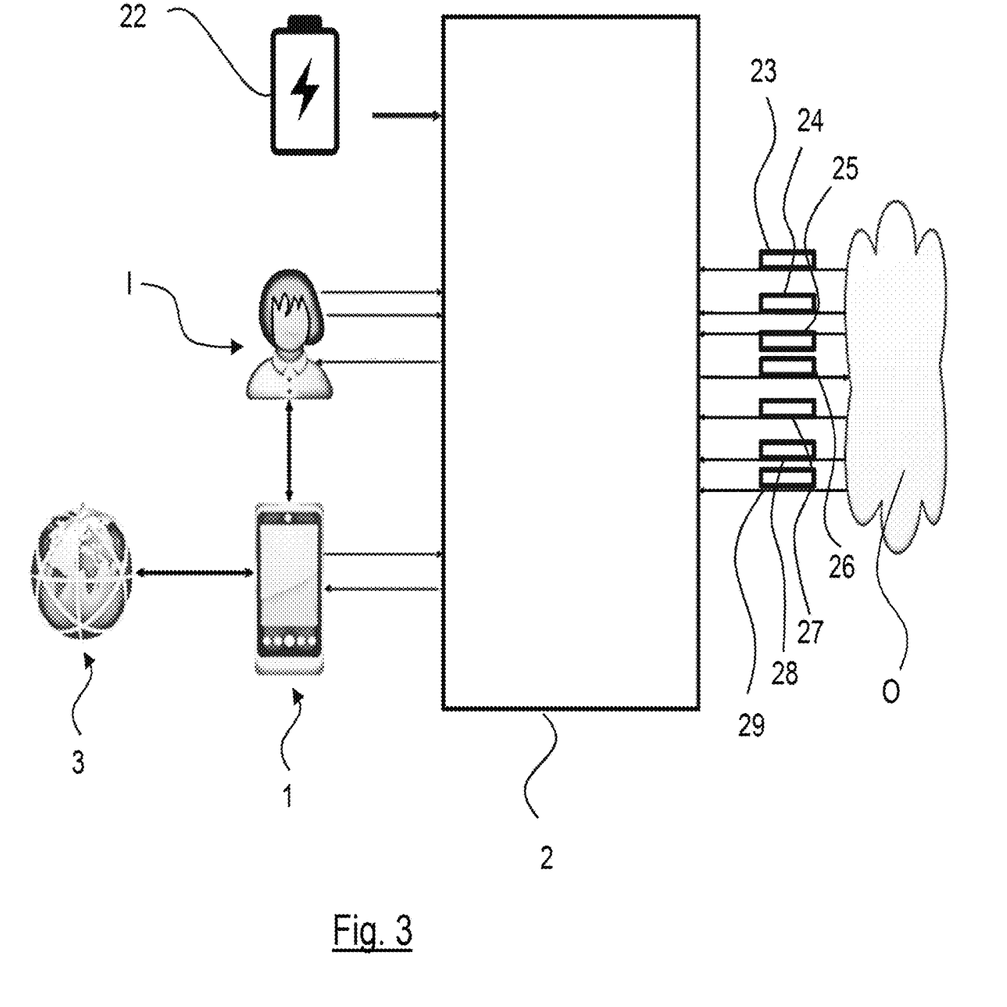
FIG. 3 provides a schematic illustration of the embedded device capable of being used for conveying an object, and of its environment in a system for conveying objects according to the invention.

In the context of a second approach of the invention, the conveying system implements a system comprising the computing platform 3, notably being based on the use of the embedded devices 2 in their turn comprising second near field wireless communication means 20, capable of communicating with the first near field wireless communication means 10. In addition, these embedded devices comprise at least one computer processing module 21 capable of cooperating with the second near field wireless communication means 20 for retrieving and processing data supplied by these second communication means.

According to a particular embodiment, the near field wireless communication means are Bluetooth type transmitters/receivers.

According to this second approach, the advertisements are distributed by the distribution module 31 of the platform 3, via a transmitter/receiver 32. The advertisement is received by the portable unit 1, thanks to its transmitter/receiver 100, and is then transferred to the embedded device by the first near field wireless communication means 10. The advertisement is received by the embedded device thanks to its second near field wireless communication means 20. The data relating to the advertisement is processed by the computer module 21 of the embedded device, the digital data relating to the advertisement being finally transmitted to the screen 200 (or to any other means of distribution).

Of course, the embedded devices may comprise many other structural and functional means, referred to later.

According to the invention, the computer module 21 of the embedded devices and computing units 1 comprise a shared computer application 13 allowing the exchange of data between them. This computer application 13 is configured for opening a communication channel intended to allow the computer module 21 of the embedded devices 2 to access and use the geolocation resources 11 of the computing units. In other words, the computer modules incorporate the computer application, which may also be loaded, from the computing platform, onto the computing units held by the individuals of the community. Once the link is established between the embedded device and the computing unit, the computer application (common to the embedded device and the computing unit) opens a communication channel via the first and second near field wireless communication means, and allows the embedded device to access and use the geolocation resources of the computing unit.

Thus, in the context of the second approach, as illustrated in FIGS. 1 and 3, the computer module of the embedded devices uses as resources dedicated to geolocation (making it possible to obtain a system of tracking the packages), those resources of the portable computing units (therefore in this case those of the smartphone held by the individual conveying the object), throughout the journey made by the individual. Of course, the tracking system applies also in the case where a plurality of individuals take turns to convey the object, the embedded device then successively communicating with each portable computing unit of the individuals.

As will be explained in more detail later, the geolocation of the object may also be achieved via a portable computing unit held by a depositary of the object, the object then optionally waiting to be picked up by a traveling individual.

As previously noted, the first near field wireless communication means and the second near field wireless communication means exchange data via Bluetooth (or via WiFi according to another conceivable embodiment).

The second near field wireless communication means and the computer processing module of the embedded devices are powered by a simple non-rechargeable battery 22.

With reference to FIG. 3, it is noted that the embedded devices may correspond to other structural and/or functional means powered, periodically or continuously by the battery of the device, and notably:

shock detection means 23;
temperature sensor 24;
humidity sensor 25;
lighting means 26;
video capture means 27;
weight measurement means 28;
opening/closure detection means 29;
means for recognition of an individual (fingerprints, eyeprints, etc.)
etc.

As can be seen in FIG. 1, the system for conveying objects comprises a computing platform 3 for managing conveying objects, including the first long distance communication means intended for communicating with second long distance communication means incorporated in the portable computing units.

This platform comprises a remotely accessible server 30 configured for receiving data for conveying an object from a departure point to an arrival point. The method of entering the departure point and the arrival point is described in more detail later.

The server further comprises means of storing 300 geolocation data transmitted to the platform by the portable units.

The system of tracking the objects to be conveyed is therefore not restricted to the local storage of the geolocation data transmitted by the portable computing units within the computer module of the embedded devices. On the contrary, in addition to the geolocation resources of the portable computing units used by the embedded devices, the latter also use the long distance communication means of the portable computing units for exchanging with the management platform.

According to the principle of the invention, the platform incorporates a module for distributing advertisements to be distributed. These advertisements may be stored in a database internal to the platform or external to the platform, on one or more hosts.

In the case where the advertisements are stored on one or more external hosts, the advertisements then pass through the distribution module of the platform, and the geolocation data are then supplied by the platform to the host(s) for triggering the targeted distribution of the advertisements to the geolocated packages.

Alternatively, the platform incorporates a buffer database of the advertisements to be distributed. The advertisements with their associated geographical area as a selective criterion for distribution, are transmitted by the advertisers to the administrator of the platform who processes them for storing them in the buffer database.

In any case, according to the principle set out previously in the context of the use of the resources of the portable computer units, the advertisements are distributed from the platform by the first means of long distance communication of the platform, which communicate with the second long distance communication means incorporated in the portable computer units. The advertisements are then transferred to the embedded devices in the packages, via the communication channel between the first and second near field wireless communication means, i.e. between the portable unit and the embedded device. The received advertisement is processed by the embedded device with a view to the display of the advertisement on the package screen.

Furthermore, the server hosts a first database 303 concerning the "client" individuals and the objects to be conveyed including:

information characterizing an object to be conveyed by weight and size;

a departure date from a geolocated location;
a delivery date from a geolocated location.

The server also hosts a second database 302 concerning the "traveling" individuals of the community and their portable computing units, including (in addition to the identity of the individuals):
a departure date of the individual;
a departure location of the individual;
an arrival date of the individual;
an arrival location of the individual.

It is noted that each embedded device is identifiable by a digital identification code, the server 30 hosting a database of digital identification codes 301 of the embedded devices.

It is further noted that the platform comprises connection and communication means with the user interfaces configured for transmitting requests for conveying objects, to the platform.

In practice, these interfaces consist of smartphones on which a dedicated computer application has been loaded. The service may also be available from a computer.

The server also hosts a third database 304 concerning the "depositary" individuals of the community and their portable computing units and/or their computer, including (in addition to their identity):
their geographical position;
the number of packages (with embedded device) that they have.

The databases 302, 303 and 304 may be separate or grouped within a global database. Each of them is capable of receiving data in conjunction with the computer applications dedicated to the user profile, in this case to the "traveling" computer application 305, the "client" computer application 306 and the "depositary" computer application 307 respectively.

The process of conveying the objects and interacting between the individuals in a system of conveying according to the invention will now be described.

According to a first example of conveying, an object is conveyed from one depositary location to another depositary location, the user of the service sending the object then having to go to the first depositary location to remove the object to be conveyed and the recipient individual has to go to the second depositary location to pick up the conveyed object.

According to this process, the user having an object to be conveyed connects to the system's platform for accessing the user interface allowing them to enter:
a departure date, from a geolocated location (insofar as the user knows the closest depositary location, otherwise the platform may specify this depositary location according to the geolocation of the user, e.g. according to their place of work or their residence);
a delivery date and a geolocated location (that may take the form of a destination address);
the weight and/or dimensions of the object;
optionally, a means of payment.

According to the departure geolocation resources entered, the platform reserves a shipping packet provided with an embedded device as previously described, and reports this reservation to the depositary location. If no shipping packet is available at the specified depositary location, the platform provides a service for consigning a shipping packet to the specified depositary location.

The user goes to the first depositary location with their object to be conveyed. With the aid of a dedicated computer application loaded onto the user's smartphone, the latter transmits the data relating to the object and its conveying to the depositary, who has the same computer application on their smartphone (or on a computer). With the aid of these identification data, the depositary identifies the shipping packet assigned to the object to be conveyed (the platform of the service having chosen a specific digital identification code of the embedded device incorporated in the shipping packet).

The depositary has the object to be conveyed in the identified shipping packet. The user validates, via their dedicated application, the handover to the depositary, the latter digitally accepting this handover, then making them responsible for the object and the shipping packet.

It is noted at this stage that the embedded device of the shipping packet begins to communicate, via the near field wireless communication means, with the smartphone of the depositary to access the geolocation resources of this smartphone.

In parallel with this, a community of individuals is declared to the system's management platform, who notably enter:
a departure date;
a departure location;
an arrival date;
an arrival location.

With the user data, and the data on the individuals of the community and on their movement, the server of the platform forms two databases, namely a database concerning the objects to be conveyed and a database concerning the portable units held by the individuals, with the data relating to the movement of the individuals.

The management system compares in real time the data relating to the shipping packet present in the depositary premises and ready to be shipped, with the database relating to the individuals of the community and to their movement. This comparison leads the platform to choose an individual for their presence near the departure depositary location and for their destination near the arrival depositary location. An alert is sent e.g. by SMS on the smartphone of the traveling individual indicating to them the time and the location where they should go to pick up the shipping packet including the object to be conveyed.

At the departure depositary location, the traveler is identified to the depositary with the aid of the computer program loaded onto their smartphone, and transmits to the depositary the identification of the shipping packet that they have just picked up.

The depositary validates the handover of the shipping packet to a traveling individual, via the computer system, which leads to:
disconnecting the smartphone of the depositary from the device embedded in the packet;
connecting the device embedded in the shipping packet to the smartphone of the traveling individual.

The traveling individual goes to the second depositary location, namely the arrival depositary location. During the journey, the device embedded in the shipping packet is permanently connected with the smartphone of the traveling individual, ensuring monitoring and geolocation of the conveyed object, these data being able to be transmitted periodically to the platform so as to be accessible to the user and the sender.

At the arrival depositary location, the traveling individual hands over the shipping packet to the depositary, indicating via computer the packet and shipment identification to the depositary, the latter validating via computer that the shipping packet has been taken in charge, which leads to:

disconnecting the embedded device of the shipping packet from the smartphone of the traveling individual;

connecting the embedded device of the shipping packet to the smartphone of the depositary.

Acceptance of taking charge of the shipping packet by the arrival depositary is reported via computer to the system's management platform, which sends an alert signal by SMS to the recipient user, by transmitting the geolocation data of the arrival depositary location to them.

The recipient individual goes to the arrival depositary location and is identified to the depositary via the computer application previously loaded onto their smartphone.

The depositary verifies the identity of the recipient individual via computer and validates the handover of the shipping packet to this individual, which leads to:

disconnecting the packet's embedded device from the depositary's smartphone;

connecting the embedded device of the shipping packet to the recipient individual's smartphone.

The recipient user validates the receipt of the shipping packet via computer, this validation being transmitted to the system's management platform which informs the sending user by SMS.

Of course, the depositary conveying system and depositary just described may be enriched upstream and downstream, via the intervention of a traveling individual conveying the shipping packet between the sending individual and the depositary departure location, and by the intervention of a traveling individual who may, at the other end of the conveying, ensure the movement of the shipping packet from the depositary arrival location to the recipient individual.

It should be noted that the conveying system according to the invention may be implemented by a system of transferring responsibility, aimed at ensuring a tracking of the successive acts of taking charge of the package or packages provided with the embedded devices previously described.

The invention claimed is:

1. A system, comprising: a computer platform comprising a computer application and a server, a portable computing unit associated with a user, and an embedded device,
   wherein the portable computing unit executes the computer application configured to:
   determine a geolocation information of the portable computing unit in proximity to the embedded device;
   transmit the geolocation information in response to a request received from the embedded device through a short-range wireless communication, wherein the embedded device is associated with at least one package;
   transmit the geolocation information associated with the embedded device through a network to the server;
   receive at least one advertisement through the network from the server, when the geolocation information of the embedded device enters a geographic datum; and
   transmit through the short-range wireless communication the at least one advertisement to be displayed on the embedded device of the at least one package when the embedded device enters a geographic distribution area associated with the geographic datum.

2. The system as claimed in claim 1, wherein the at least one advertisement is to be displayed on a screen on the embedded device of the at least one package.

3. The system as claimed in claim 2, wherein the screen consists of electronic paper.

4. The system as claimed in claim 1, wherein geolocation resources are incorporated in the embedded devices of the packages.

5. The system as claimed in claim 1, wherein geolocation resources are incorporated in the portable computing units.

6. The system as claimed in claim 1, wherein the embedded device comprises a computer processing module comprising said computer application with a view to allowing an exchange of data between the computer processing module and the portable computing units, the computer application being configured for opening a communication channel intended to allow the embedded devices to access and use geolocation resources of the computing units.

7. A method comprising:
   determining, by a portable computing unit executing a computer application, a geolocation information of the portable computing unit in proximity to an embedded device, wherein the portable computing unit is associated with a user;
   transmitting, by the portable computing unit executing the computer application, the geolocation information in response to a request received from the embedded device through a short-range wireless communication, wherein the embedded device is associated with at least one package;
   transmitting, by the portable computing unit, the geolocation information associated with the embedded device through a network to a server;
   receiving, by the portable computing unit, at least one advertisement through the network from the server, when the geolocation information of the embedded device enters a geographic datum; and
   transmitting, by the portable computing unit through the short-range wireless communication, the at least one advertisement to be displayed on the embedded device of the at least one package when the embedded device enters a geographic distribution area associated with the geographic datum.

8. A non-transitory computer readable medium comprising instructions, when executed by at least one processor, performing the steps of:
   determining a geolocation information of the portable computing unit in proximity to an embedded device, wherein the portable computing unit is associated with a user;
   transmitting the geolocation information in response to a request received from the embedded device through a short-range wireless communication, wherein the embedded device is associated with at least one package;
   transmitting the geolocation information associated with the embedded device through a network to a server;
   receiving at least one advertisement through the network from the server, when the geolocation information of the embedded device enters a geographic datum; and
   transmitting, through the short-range wireless communication, the at least one advertisement to be displayed on the embedded device of the at least one package.

\* \* \* \* \*